Aug. 7, 1945.  R. W. BROWN  2,381,399
TORQUE TUBE SUPPORT
Original Filed Oct. 24, 1938  2 Sheets-Sheet 1

Inventor
ROY W. BROWN
By Ely & Frye
Attorneys

Aug. 7, 1945.    R. W. BROWN    2,381,399
TORQUE TUBE SUPPORT
Original Filed Oct. 24, 1938    2 Sheets-Sheet 2
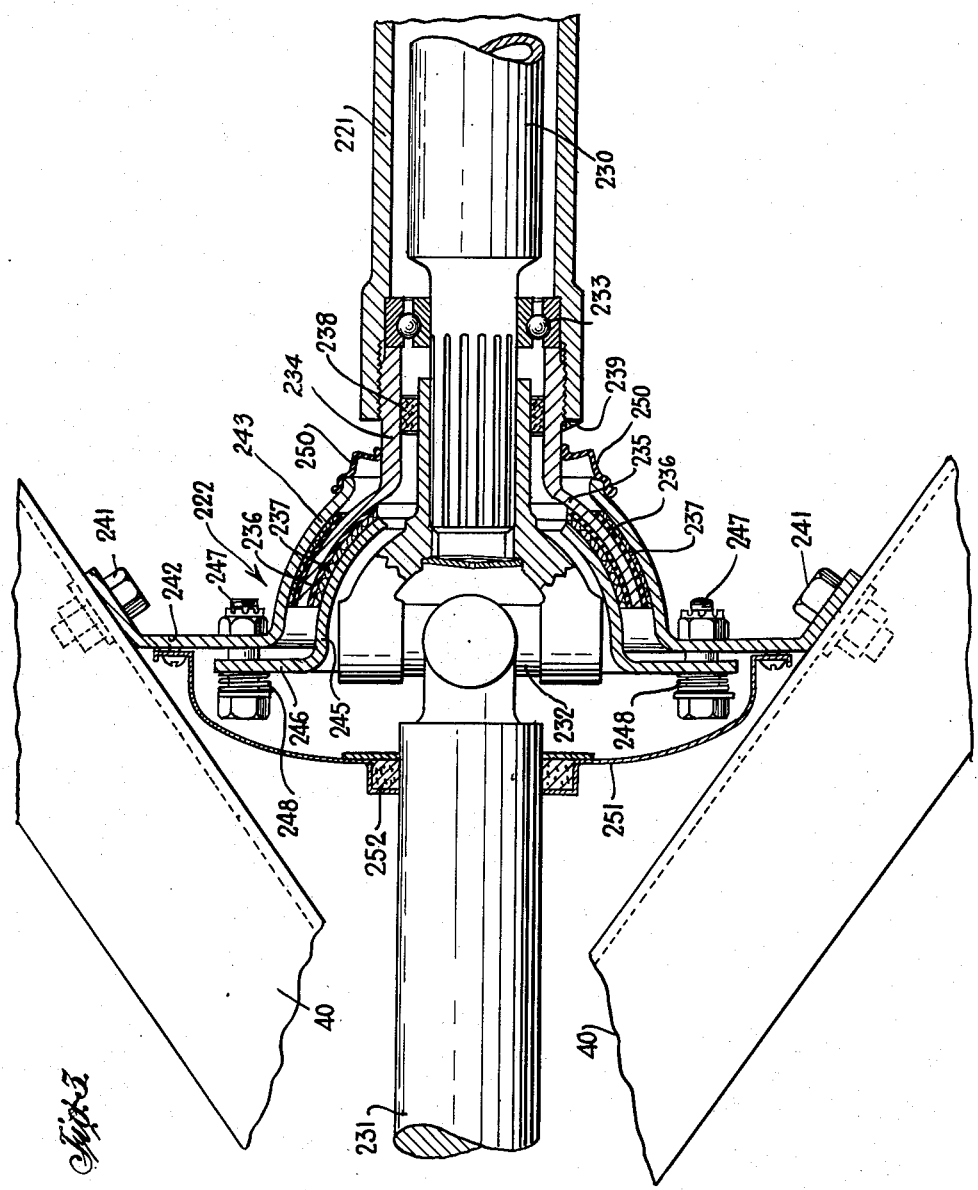
Inventor
ROY W. BROWN
By Ely & Frye
Attorneys Patented Aug. 7, 1945

2,381,399

UNITED STATES PATENT OFFICE 2,381,399

TORQUE TUBE SUPPORT

Roy W. Brown, Akron, Ohio, assignor to The Firestone Tire & Rubber Company, Akron, Ohio, a corporation of Ohio Original application October 24, 1938, Serial No. 236,693. Divided and this application July 3, 1944, Serial No. 543,227

3 Claims. (Cl. 180—85)

This invention relates to vehicle suspensions, and more especially it relates to improved mechanism interposed between the running gear and the frame or body of a vehicle for controlling movement of said running gear relatively of said frame or body, under actual operating conditions.

The invention is of primary utility in combination with resilient vehicle suspensions having no inherent friction and/or no lateral stability. Thus it may be used advantageously with coiled spring suspensions, or with pneumatic suspensions. It is the latter type of suspension that is employed in the illustrative embodiment of the invention herein depicted.

The advent of soft suspensions in modern motor vehicles, for the purpose of increasing riding comfort, has raised new problems for the reason that soft springs provide unstable suspensions, thus requiring the addition of some suitable stabilizing mechanism. Such means should produce low body frequency and low vertical accelerations of the body of the vehicle even when the running gear is subjected to high frequency shocks. Liquid shock absorbers provided for this purpose have been found unsuitable because of high viscous drag of the liquid. Furthermore, soft spring suspensions reduce the allowable variance in the friction of the suspension which will still produce an acceptable ride. Therefore it has been found desirable to eliminate, as nearly as is possible, all of the friction inherent in the suspension, and to provide friction-producing devices whereby the amount of friction and the frictional characteristics can be definitely controlled in the different types of suspensions, and under the different operating conditions that may be encountered.

One object of the invention is to provide means for maintaining the running gear and frame or body in certain relative fixed relation while permitting, but resiliently opposing, certain other relative movements.

Another object is to insulate the noise incident to the comparatively high frequency mechanical vibrations of the tires and running gear from the body or frame.

Another object is to provide means for resiliently opposing the tendency of the body to roll when the vehicle is driven through curves, without at the same time appreciably nullifying the advantages of the soft suspension.

Another object is to provide a vehicle suspension in which means are provided for resiliently supporting the body or frame on the running gear and in which separate means are provided for taking the thrust and torque reactions of the running gear, the latter means being connected with the running gear or frame through rubber connections in such a manner that the relative pivotal movements between the body and running gear along an axis generally longitudinal of the vehicle will be resiliently resisted without substantially affecting the rate of the suspension for relative straight vertical movements and while at the same time the noise from the tires and running gear will be effectively insulated from the frame or body.

The chief objects of the invention are to provide an improved vehicle suspension that will reduce the oscillations of the vehicle body about the center of gravity; to provide a vehicle suspension in which the friction is controllable; to provide a vehicle suspension whereby stability of the body is maintained while at the same time maintaining the low rate of the suspension; to provide a vehicle suspension comprising a friction mechanism that will absorb torque and thrust reactions. Other objects will be manifest as the specification proceeds.

In accordance with the invention, friction-producing mechanism is operatively associated with thrust-translating devices that connect the body or frame of the vehicle with the running gear thereof, and which are subjected to various strains arising from relative movement of said body and running gear.

The embodiments of the invention herein shown comprises a pneumatic suspension system having a very desirable rate characteristic without harshness resulting from sudden changes of velocities of non-compressible fluids, but it will be understood that the invention may be used in combination with the conventional liquid shock absorber, preferably adjusted to prevent a "harsh" ride, that is, adjusted so that the resistance of the shock absorber to all normal impacts is not large as compared to the rate of the spring.

Of the accompanying drawings:

Figure 3 is a diametric, horizontal section, on a larger scale, of the universal joint and friction-producing device shown in Figures 1 and 2.

This application is a division of my copending application Serial No. 236,693 filed October 24, 1938.

Figure 1:
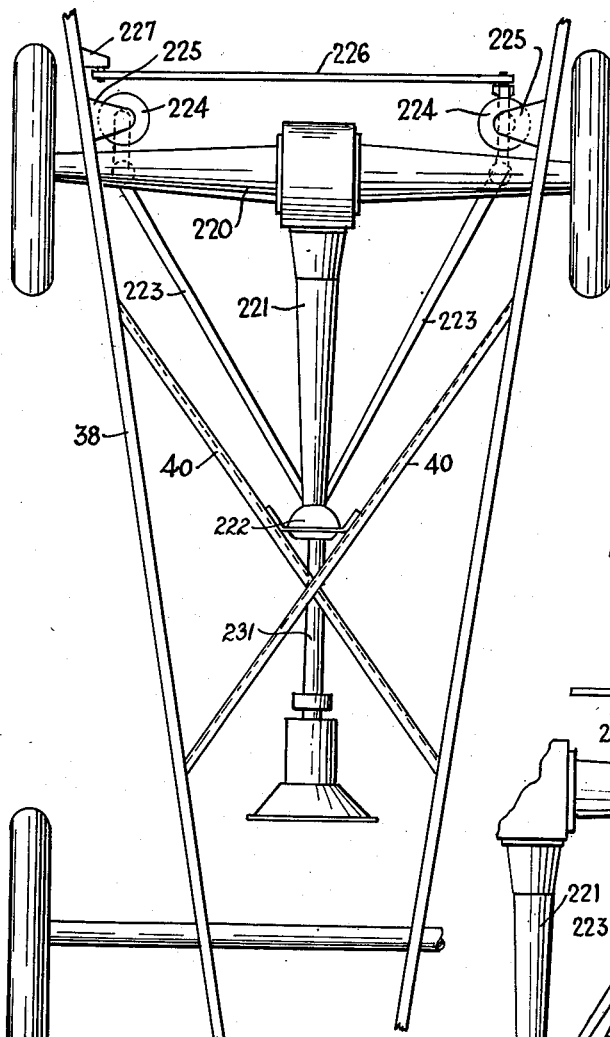
Figure 1 is fragmentary plan view of the frame and running gear of a motor vehicle, and an embodiment of the improved vehicle suspension operatively associated therewith, the stabilizing structure of the suspension comprising universal friction-producing means incorporated in the torque tube in the region of the universal joint.
Figure 2:
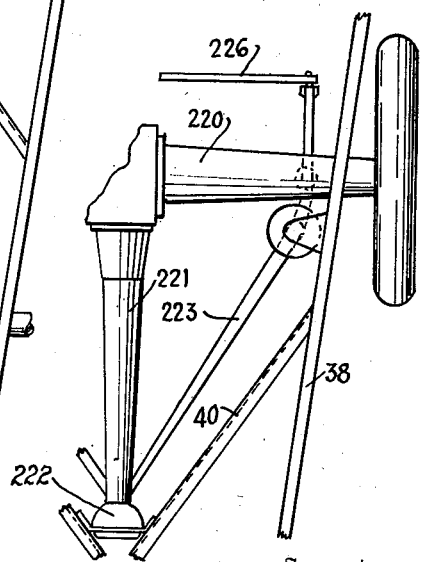
Figure 2 is a fragmentary plan view similar to Figure 1 showing a pneumatic element of the suspension in a different position.

Referring now to the drawings in Figure 1, there is shown the usual vehicle frame 38 including cross-braces 40, 40. The rear axle housing is designated 220, and is provided with a torque tube 221 through which the vehicle drive extends. The latter includes a universal joint disposed immediately in front of the torque tube, and positioned about said universal joint is a friction device, generally designated 222, that is connected to the frame 38 and adapted frictionally to resist torque and thrust reactions of the running gear. The running gear includes a pair of torque rods 223, 223 that are secured at one end to the axle housing 220, adjacent the respective ends of the latter, and at their other ends are secured to the torque tube 221, immediately behind the friction device 222. The frame 38 is supported upon the running gear by means of a pneumatic suspension system of which bellows members 224, 224 are a part, said bellows being seated upon the respective torque rods 223, rearwardly of the axle housing 220, the tops of the bellows bearing against suitable overhanging brackets 225, 225 carried by the frame 38. Pivotally connected to the rear end of one of the torque rods 223 is a transversely extending stabilizer rod 226 that has its other end pivotally connected to a bracket 227 secured to the frame 38. The stabilizer rod is of the construction and for the purpose previously set forth. The arrangement shown in Figure 2 is identical with that shown in Figure 1 except that the bellows 224 of the suspension system are positioned in front of the rear axle housing 220.

The detail construction of the friction device 222 is shown in Figure 3 to which attention now is directed. Within the torque tube 221 is a shaft 230 that extends to the differential mechanism in the axle housing, said shaft 230 being connected to shaft 231 from the vehicle motor through the agency of a universal joint 232 of the usual well-known construction, said universal joint being positioned adjacent the intersection of the cross braces 40. There is a ball bearing 233 positioned between the torque tube 221 and the shaft 230 adjacent universal joint 232. Threaded into the forward end of the torque tube 221 and abutting the outer race of bearing 233 is the tubular, rear portion 234 of a movable element of the friction device 222, the forward end portion of said element being of concavo-convex shape, as shown at 235, and positioned concentrically with relation to the center of the universal joint 232. Vulcanized to the concave and to the convex surfaces of portion 235 are respective layers of resilient rubber composition 236, 236, and bonded to the latter are facings 237, 237 of friction material, preferably textile fabric impregnated with graphite-castor oil composition. The arrangement is such that the rubber layers 236 constitute a resilient backing between the friction facings 237 and the surfaces of the concavo-convex structure 235. There is an annular sealing gasket 238 interposed between portion 234 of the movable element and the enclosed hub portion of the universal joint 232. Preferably the tubular portion 234 is permanently secured to the torque tube 221, as by the welding indicated at 239.

Secured to the cross-braces 40 of the frame, as by means of the bolts 241, is an annular plate 242 that is positioned substantially in the medial plane of rotation of the universal joint, and formed about the axial aperture of said plate is a concavo-convex formation 243 that is disposed exteriorly of the similarly shaped structure 235 and is concentric with the center of the universal joint. Normally the friction facing 237 on the convex side of portion 235 is in abutting relation to the concave face of formation 243, the latter constituting a socket for the portion 235. Positioned concentrically within the latter is an annular, concavo-convex shell 245 that encircles the universal joint and has its convex face in abutting relation to the friction facing 237 on the concave face of portion 235. Shell 245 is formed with a radially outwardly extending marginal flange 246 that is disposed parallel to plate 242 and in spaced relation thereto, said flange being secured to said plate by a plurality of bolts 247, 247. There is a coiled compression spring 248 between the head of each bolt 247 and the adjacent face of flange 246, the arrangement being such as to urge the shell 245 axially toward the portion 235 with the result that there is at all times good frictional contact between the friction facings 237 on both sides of portion 235, and the concavo-convex structures 243 and 245 that engage said facings.

A flexible annular sealing ring 250 of rubber embraces the tubular structure 234 of the movable member of the device and the adjacent margin at the inner circumference of the structure 243 to prevent the escape of lubricant between said members. At the opposite side of the device is a closure consisting of an annular dished plate 251 that is secured, at its outer circumference to the plate 242, and at its inner circumference carries an annular sealing gasket 252 that embraces the drive-shaft 231. When the closure plate 251 is removed the heads of bolts 247 are exposed so that by the adjusting of said bolts the force of springs 248 may be varied to alter the friction between the friction facings 237 and the structures that engage them. The arrangement is such that any relative movement between the running gear of the vehicle and the frame 38, such as torque and thrust reactions, are translated through the torque tube to the friction device at the universal joint, which device is universal in its ability to offer determinate frictional resistance to said relative movements.

It will be seen that applicant has provided a vehicle suspension system of the pneumatic type wherein there is controllable friction, with resulting improvement of the riding qualities of the vehicle. By mounting the bellows on the torque rods which are connected respectively to the axle housing and to the torque tube through the universal movement friction devices, the latter supports a part of the vehicle body weight and impact forces upwardly on the wheels automatically increase the frictional resistance to relative oscillations between the running gear and body or frame. The invention provides stability to the vehicle body while maintaining the desirable low rate of the suspension at normal driving conditions, and achieves the other advantages set out in the foregoing statement of objects.

Other modification may be restorted to without departing from the spirit of the invention, or the scope thereof as defined by the appended claims.

What is claimed is:

1. In a vehicle suspension, the combination of a frame of a vehicle, an axle including a torque tube, a propeller shaft within said torque tube, said shaft being supported at its front end by a bearing interposed between said torque tube and shaft, and a friction device operatively interposed between the frame and the torque tube and frictionally resisting relative movements between said frame and torque tube in all directions.

2. In a vehicle suspension, the combination of a frame of a vehicle, an axle including a torque tube, there being a propeller shaft extending through the latter and having a universal joint adjacent the forward end thereof, said shaft being supported at its forward end by a bearing interposed between said torque tube and shaft, and a friction device operatively interposed between the frame and the torque tube and frictionally resisting relative movements between said frame and torque tube, said friction device being concentric with said universal joint.

3. In a vehicle suspension, the combination of a frame or body of a vehicle, an axle including a torque tube, and a friction device operatively interposed between said frame or body and the torque tube, said device comprising a tubular structure fixed in the forward end of the torque tube and formed with a concavo-convex end portion, facings of friction material on the concave and on the convex faces thereof, an annular, concavo-convex structure encircling said end portion with its concave face in contact with the convex friction facing, said annular structure being secured to said frame or body, and an annular concavo-convex shell having its convex face in contact with the concave friction facing, said shell being carried by the said annular structure and yieldingly urged axially toward the latter.

ROY W. BROWN.